(12) United States Patent
Qian et al.

(10) Patent No.: US 12,344,135 B2
(45) Date of Patent: Jul. 1, 2025

(54) AUTOMOBILE SEAT AND AUTOMOBILE COMPRISING SAME

(71) Applicant: YANFENG AUTOMOTIVE TRIM SYSTEMS CO., LTD, Shanghai (CN)

(72) Inventors: Dahai Qian, Shanghai (CN); Chengliang Zhu, Shanghai (CN); Deyu Liu, Shanghai (CN); Yueyun Chen, Shanghai (CN); Xun Tang, Shanghai (CN)

(73) Assignee: YANFENG AUTOMOTIVE TRIM SYSTEMS CO., LTD, Shanghai (CN)

( * ) Notice: Subject to any disclaimer, the term of this patent is extended or adjusted under 35 U.S.C. 154(b) by 619 days.

(21) Appl. No.: 17/637,337

(22) PCT Filed: Mar. 5, 2020

(86) PCT No.: PCT/CN2020/077923
§ 371 (c)(1),
(2) Date: Aug. 15, 2022

(87) PCT Pub. No.: WO2021/036222
PCT Pub. Date: Mar. 4, 2021

(65) Prior Publication Data
US 2022/0396180 A1    Dec. 15, 2022

(30) Foreign Application Priority Data
Aug. 23, 2019  (CN) .......................... 201910782503.1

(51) Int. Cl.
*B60N 2/16*     (2006.01)
*B60N 2/02*     (2006.01)
*B60N 2/225*    (2006.01)

(52) U.S. Cl.
CPC ......... *B60N 2/164* (2013.01); *B60N 2/02246* (2023.08); *B60N 2/1615* (2013.01); *B60N 2/165* (2013.01); *B60N 2/2252* (2013.01)

(58) Field of Classification Search
None
See application file for complete search history.

(56) References Cited

U.S. PATENT DOCUMENTS

| | | |
|---|---|---|
| 6,267,443 B1 | 7/2001 | Kurita et al. |
| 2002/0023988 A1 | 2/2002 | Becker et al. |
| (Continued) | | |

FOREIGN PATENT DOCUMENTS

| | | |
|---|---|---|
| CN | 107072396 A | 8/2017 |
| CN | 107914605 A | 4/2018 |
| (Continued) | | |

OTHER PUBLICATIONS

Japanese Notice of Reasons for Refusal issued in Japan Patent Application No. 2022-513218, dated May 9, 2023, with English translation, 7 pages.

(Continued)

*Primary Examiner* — David R Dunn
*Assistant Examiner* — Tania Abraham
(74) *Attorney, Agent, or Firm* — MH2 Technology Law Group LLP

(57) ABSTRACT

An automobile seat and an automobile comprising same, the automobile seat comprising a seat base, a seat back and a seat back adjusting mechanism; the seat back adjusting mechanism comprises a rotating part which is disposed at the lower end of the seat back; the rotating part rotates about the rear end part of the seat base to enable the angle between the seat back and the seat to be changed, and the center of rotation of the rotating part is located below the upper end surface of the seat base. A small step difference may be (Continued)

formed between the lower end part of the seat back and the upper end surface of the seat base when the seat back rotates, and a step difference may even be avoided. The lower end part of the seat back basically does not abut against and press the back of a passenger.

11 Claims, 6 Drawing Sheets

(56) References Cited

U.S. PATENT DOCUMENTS

| | | | | |
|---|---|---|---|---|
| 2010/0102586 A1* | 4/2010 | Jungert | ............... | B60N 2/181 296/65.05 |
| 2011/0241400 A1* | 10/2011 | Ito | ............... | B60N 2/165 297/311 |
| 2012/0153658 A1* | 6/2012 | Kanda | ............... | B60N 2/1615 296/65.13 |
| 2014/0224553 A1* | 8/2014 | Ozawa | ............... | B60N 2/0024 177/136 |
| 2018/0065530 A1 | 3/2018 | Hosi | | |
| 2018/0099583 A1* | 4/2018 | Yagi | ............... | B60N 2/1635 |
| 2020/0262319 A1* | 8/2020 | Abe | ............... | B60N 2/02253 |

FOREIGN PATENT DOCUMENTS

| | | |
|---|---|---|
| CN | 108327589 A | 7/2018 |
| CN | 108698525 A | 10/2018 |
| CN | 109050355 A | 12/2018 |
| CN | 109849744 A | 6/2019 |
| CN | 110435501 A | 11/2019 |
| EP | 3428005 A1 | 1/2019 |
| FR | 2982207 A1 | 5/2013 |
| WO | 2015082672 A1 | 6/2015 |
| WO | 2016036569 A | 3/2016 |

OTHER PUBLICATIONS

Extended European search report issued in European Patent Application No. 20859482.0 issued on Aug. 10, 2023, 8 pages.
International Search Report (with English Translation) in Corresponding International Application No. PCT/CN2020/077923 mailed Jun. 9, 2020 on 9 pages.
Written Opinion (with English Translation) in Corresponding International Application No. PCT/CN2020/077923 mailed Jun. 9, 2020 on 9 pages.
Chinese First Office Action (with English Translation) in Chinese Application No. 201910782503.1 mailed on Mar. 23, 2020, 14 pages.
Chinese Second Office Action (with English Translation) in Chinese Application No. 201910782503.1 mailed on Jul. 27, 2020, 11 pages.
Chinese Third Office Action (with English Translation) in Chinese Application No. 201910782503.1 mailed on Feb. 3, 2021, 20 pages.

* cited by examiner

AUTOMOBILE SEAT AND AUTOMOBILE COMPRISING SAME

CROSS REFERENCE TO RELATED APPLICATIONS

The present application is the national stage entry of International Patent Application No. PCT/CN2020/077923, filed on Mar. 5, 2020, and published as WO 2021/036222 A1 on Mar. 4, 2021, which claims the benefit of Chinese Patent Application No. 201910782503.1, filed on Aug. 23, 2019, all of which are incorporated by reference herein in their entirety.

TECHNICAL FIELD

The present disclosure relates to the technical field of automobiles, in particular to an automobile seat and an automobile comprising same.

BACKGROUND

The current seat functions generally include the adjustment of the height of the seat base and the angle of the seat back, which operate independently. The purpose of seat base adjustment is to match drivers in different positions to ensure the vision requirements when driving, and the purpose of seat back adjustment is to improve driving comfort. However, in the existing automobile seat, as shown in FIG. 1, a schematic diagram of the principle, the rotation center C of the seat back 2 is located above the seat base 1. The resulting problem is that a step difference is formed between the lower end of the seat back 2 and the seat base 1 during the backward adjustment of the seat back 2, and the greater the backward adjustment angle of the seat back 2, the greater the step difference. As shown in FIG. 2, when the seat back 2 is adjusted backward, a step difference S is formed between the front bump A at the lower end of the seat back 2 and the seat base 1, and during the backward rotation of the passenger's trunk 3, its back will be pressed by the front bump A, so that the back cannot fit the seat back 2, which affects the ride comfort.

In the prior art, in order to improve the ride comfort after the seat back is adjusted, and to avoid or reduce the step difference, a softer foam is used in the area of the front bump A at the lower end of the seat back, or a larger fillet is used in the shape. Or add a new mechanism to ensure that the seat base and the seat back rotate together, such as the Chinese invention patent application "CN109050355A" by adding an additional mechanism at the lower end of the slide rail of the conventional seat to drive the seat angle, or as another Chinese invention application "CN107072396A" adopts the method of multi-link. Although the above methods can improve the comfort of the seat, they either add coating materials or add additional mechanisms, which not only does not reduce the step difference between the seat back and the seat base, but also increases the production cost of the seat.

CONTENT OF THE PRESENT INVENTION

The technical problem to be solved in the present disclosure is for overcoming the defect of the prior art that when the seat back of the automobile seat is adjusted separately, the lower end of the seat back will push against the back of the passenger, which affects the ride comfort, and then provides a automobile seat and a automobile containing the automobile seat.

The present disclosure solves the above-mentioned technical problems through the following technical solutions:

An automobile seat, comprising a seat base and a seat back, is characterized in that the automobile seat further includes a seat back adjusting mechanism, and the seat back adjusting mechanism includes a rotating part, and the rotating part is arranged on the lower end of the seat back;

the rotating part is used for rotating about the rear end part of the seat base to enable the angle between the seat back and the seat base to be changed, and the center of rotation of the rotating part is located below the upper end surface of the seat base.

In this solution, by setting the rotation center of the seat back at the bottom of the seat back and below the upper end surface of the seat base, thus a small step difference may be formed between the lower end part of the seat back and the upper end surface of the seat base when the seat back rotates, and the step difference may even be avoided. As such, it may be ensured that the lower end part of the seat back basically does not abut against and press the back of a passenger, the fit between the back of the passenger and the seat back is improved, and the comfort of riding is ensured.

Preferably, the automobile seat further includes a seat base adjusting mechanism, and the seat base adjusting mechanism is used to adjust the seat base to realize the up-and-down adjustment of the seat base in the height direction.

In this solution, by setting the seat base adjusting mechanism, the height of the seat can be adjusted to meet the needs of passengers with different heights and further improve the ride comfort.

Preferably, the seat back adjusting mechanism and the seat base adjusting mechanism are independent of each other during adjustment.

In this solution, the seat back adjusting mechanism and the seat base adjusting mechanism are independent of each other during adjustment, which allows adjustments to be made according to the requirements of passengers, and also avoids the occurrence of damage to one of them and inability to adjust the other.

Preferably, a first angle adjuster is installed on the rotating part, the fixed part of the first angle adjuster is installed on the seat base, and the twirling part of the first angle adjuster is installed on the rotating part.

In this solution, by installing the angle adjuster on the rotating part of the seat back, the seat back can be adjusted conveniently and quantitatively.

Preferably, the seat base includes two symmetrically arranged side wall panels, the rear ends of the two side wall panels are both provided with first through holes, and the seat back includes two symmetrically arranged back wall panels, the lower end of each back wall panel is fixed with a connecting plate, and the connecting plate is provided with a second through hole;

The fixed part of first angle adjuster and the twirling part of the first angle adjuster are respectively mounted on the first through hole and the second through hole.

In this solution, both the seat and the seat back are assembled through framework structure, and the assembly of the seat is realized by the simple side wall panel and the back wall panel, which not only reduces the weight of the seat, but also reduces the production cost.

Preferably, a first connecting rod is provided between the two side wall panels, and both ends of the first connecting rod are respectively fixedly connected to the twirling parts of the two first angle adjusters.

In this solution, the two side wall panels can be connected by the connecting rod, and when the angle adjuster on one of the side wall panels is driven to work, the angle adjuster on the other side can be driven to work, and the two sides do not need to be rotated at the same time.

Preferably, the seat base adjusting mechanism includes two first brackets, two second brackets, and second angle adjuster, and the two first brackets are correspondingly arranged on both sides of the front end of the seat base, two second brackets are correspondingly arranged on both sides of the rear end of the seat base;

wherein, the first bracket is hinged on the front end of the seat base, the upper end of the second bracket rotates freely around the rotation center of the seat back, and the lower ends of the first bracket and the second bracket are hinged on the mounting holder of the seat base respectively;

the second angle adjuster is used to adjust the angle between the first bracket and the seat base or the angle between the second bracket and the seat base, so as to realize the up-and-down adjustment of the seat base in the height direction.

In this solution, the seat base adjusting mechanism adopts two first brackets, two second brackets, the seat base, and the seat base's mounting holder to form two sets of four-bar linkages, and the two sets of four-bar linkages are adjusted by another angle adjuster, which changes the angle between the first bracket and the seat base or the angle between the second bracket and the seat base, so as to realize the up-and-down adjustment of the seat base in the height direction.

Preferably, the upper end of the second bracket is provided with an accommodating hole, and the fixed part of the first angle adjuster passes through the accommodating hole and rotates freely relative to the accommodating hole;

the second bracket is provided with a tooth part, the fixed part of the second angle adjuster is mounted on the seat base, and the twirling part of the second angle adjuster is provided with a gear that meshes with the teeth of the tooth part, the gear drives the second bracket to rotate using a driving mechanism to realize the up-and-down adjustment of the seat base in the height direction.

In this solution, in order to use the second angle adjuster to change the angle between the second bracket and the seat base, a tooth part can be provided on the second bracket, and the rotation of the second bracket can be realized by the rotation of the gear on the second angle adjuster; at the same time, in order to make the seat base rotate together, the second bracket is provided with an accommodating hole which rotates freely relative to the fixed part of the first angle adjuster, so that the second bracket drives the seat base to rotate together during the rotation, so as to change the angle between the second bracket and the seat base to adjust the height of the seat base.

Preferably, the upper end of the second bracket is provided with an accommodating hole, and the fixed part of the first angle adjuster passes through the accommodating hole and rotates freely relative to the accommodating hole;

the seat base adjusting mechanism further includes a rack plate, and both ends of the rack plate are hinged on the upper hinge point of the first bracket and the lower end hinge point of the second bracket respectively;

the twirling part of the second angle adjuster is provided with a gear that meshes with the teeth of the rack plate, the gear drives the rack plate to rotate using the driving mechanism to realize the up-and-down adjustment of the seat base in the height direction.

In this solution, the seat height is adjusted mainly by changing the angle between the first bracket and the seat base using the second angle adjuster, by adding a rack plate, the rotation of the upper end of the rack plate is realized by the rotation of the gear on the second angle adjuster, and the rotation of the first bracket is driven at the same time, the second bracket is provided with an accommodating hole which rotates freely relative to the fixed part of the first angle adjuster, so that the first bracket drives the seat base to rotate together during the rotation, so as to change the angle between the first bracket and the seat base to adjust the height of the seat base.

Preferably, the seat base's mounting holder is provided with a first hinging seat and a second hinging seat, and the lower ends of the first bracket and the second bracket are hinged on the first hinging seat and the second hinging seat respectively.

In this solution, in order to facilitate the hinge connection of the lower ends of the first bracket and the second bracket, a hinging seat is provided on the seat base's mounting holder.

Preferably, the twirling part of the first angle adjuster is provided with a first driving mechanism, the first driving mechanism is a manual adjustment mechanism or an automatic adjustment mechanism, and the first driving mechanism is used to drive the twirling part of the first angle adjuster.

Preferably, the twirling part of the second angle adjuster is provided with a second driving mechanism, the second driving mechanism is a manual adjustment mechanism or an automatic adjustment mechanism, and the second driving mechanism is used to drive the twirling part of the second angle adjuster.

In this solution, both the first angle adjuster and the second angle adjuster can be driven by a manual adjustment mechanism, and can also be adjusted by an automatic adjustment mechanism, or a manual adjustment mechanism and an automatic adjustment mechanism can be installed on both sides of the seat base respectively, which can be selected according to the demand.

An automobile is characterized in that the automobile comprises an automobile seat as described above.

On the basis of meeting common knowledge in the art, each of the above-mentioned preferred conditions can be any combination, i.e. preferred examples of the present disclosure is obtained.

The positive progressive effect of the invention is that: in the automobile seat of the present invention, by setting the rotation center of the seat back at the bottom of the seat back and below the upper end surface of the seat base, thus a small step difference may be formed between the lower end part of the seat back and the upper end surface of the seat base when the seat back rotates, and a step difference may even be avoided. As such, it may be ensured that the lower end part of the seat back basically does not abut against and press the back of a passenger, the fit between the back of the passenger and the seat back is improved, and the comfort of riding is ensured.

DESCRIPTION OF REFERENCE NUMERALS

Figure 1:
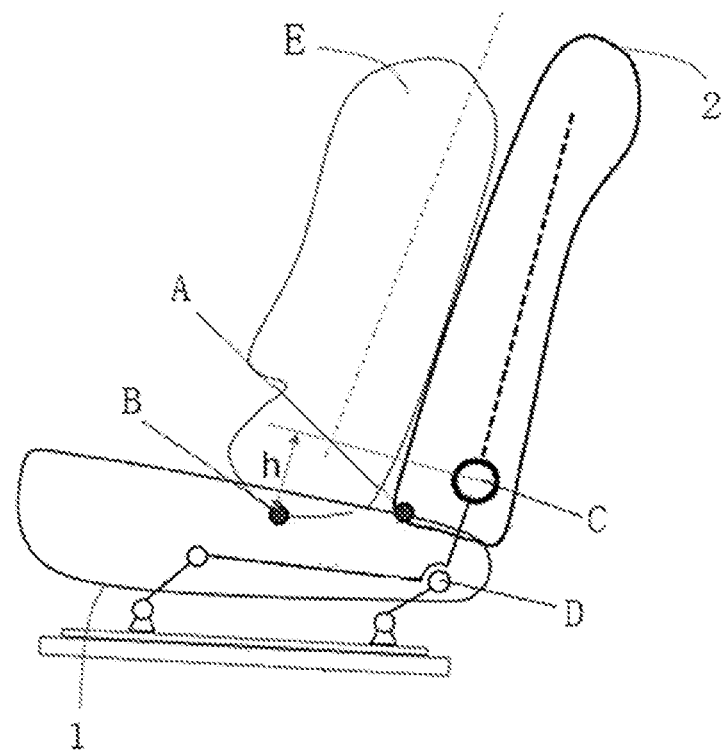
FIG. 1 is a schematic structural diagram of a seat in the prior art.
Figure 2:
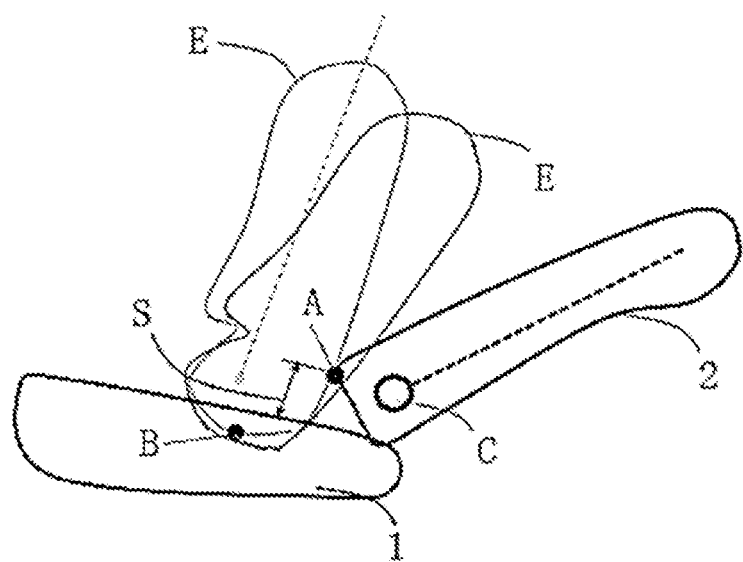
FIG. 2 is a schematic diagram of the adjustment of the seat back in the prior art.
Figure 3:
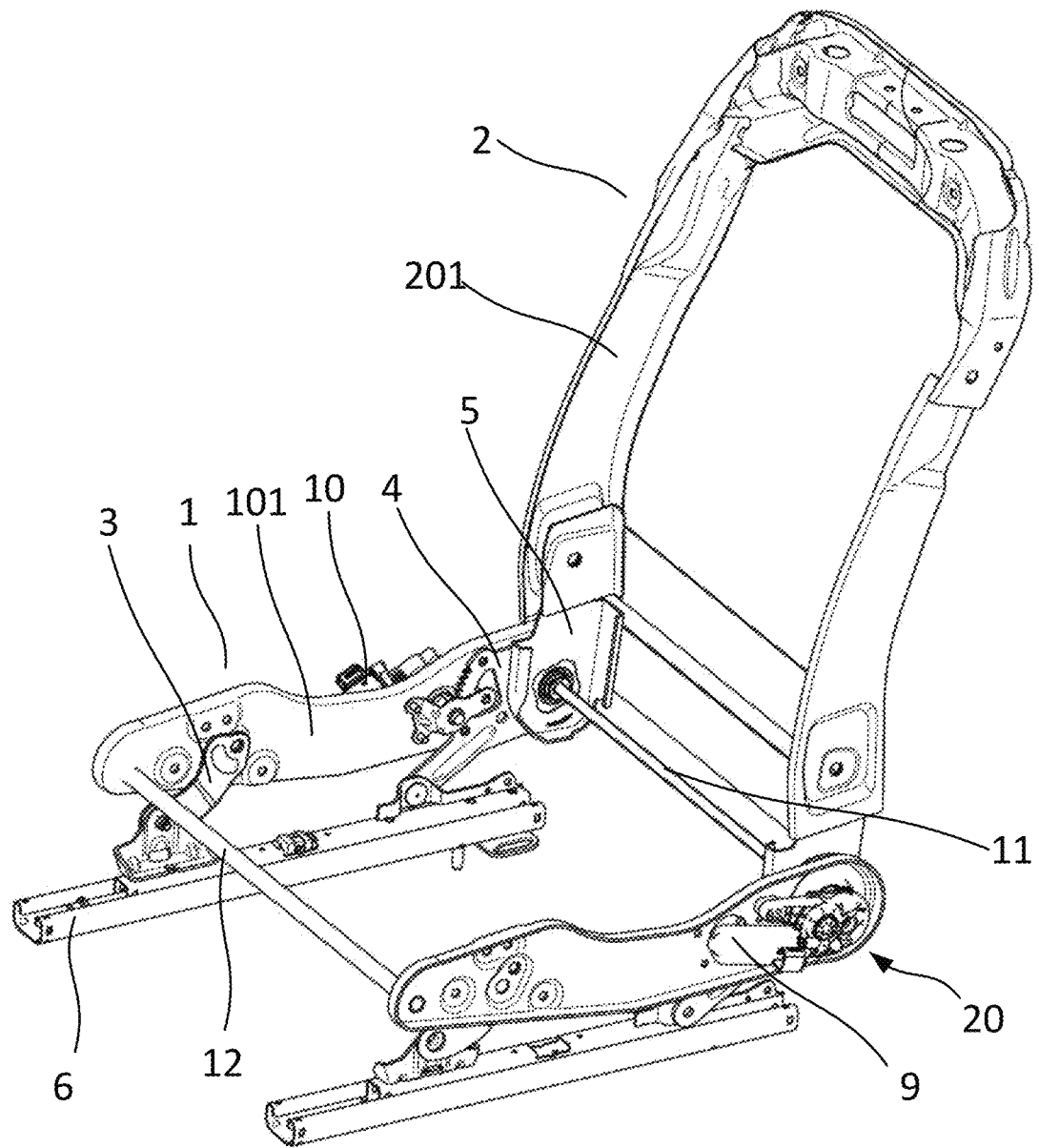
FIG. 3 is a schematic structural diagram of a seat in embodiment 1 of the present invention.
Figure 4:
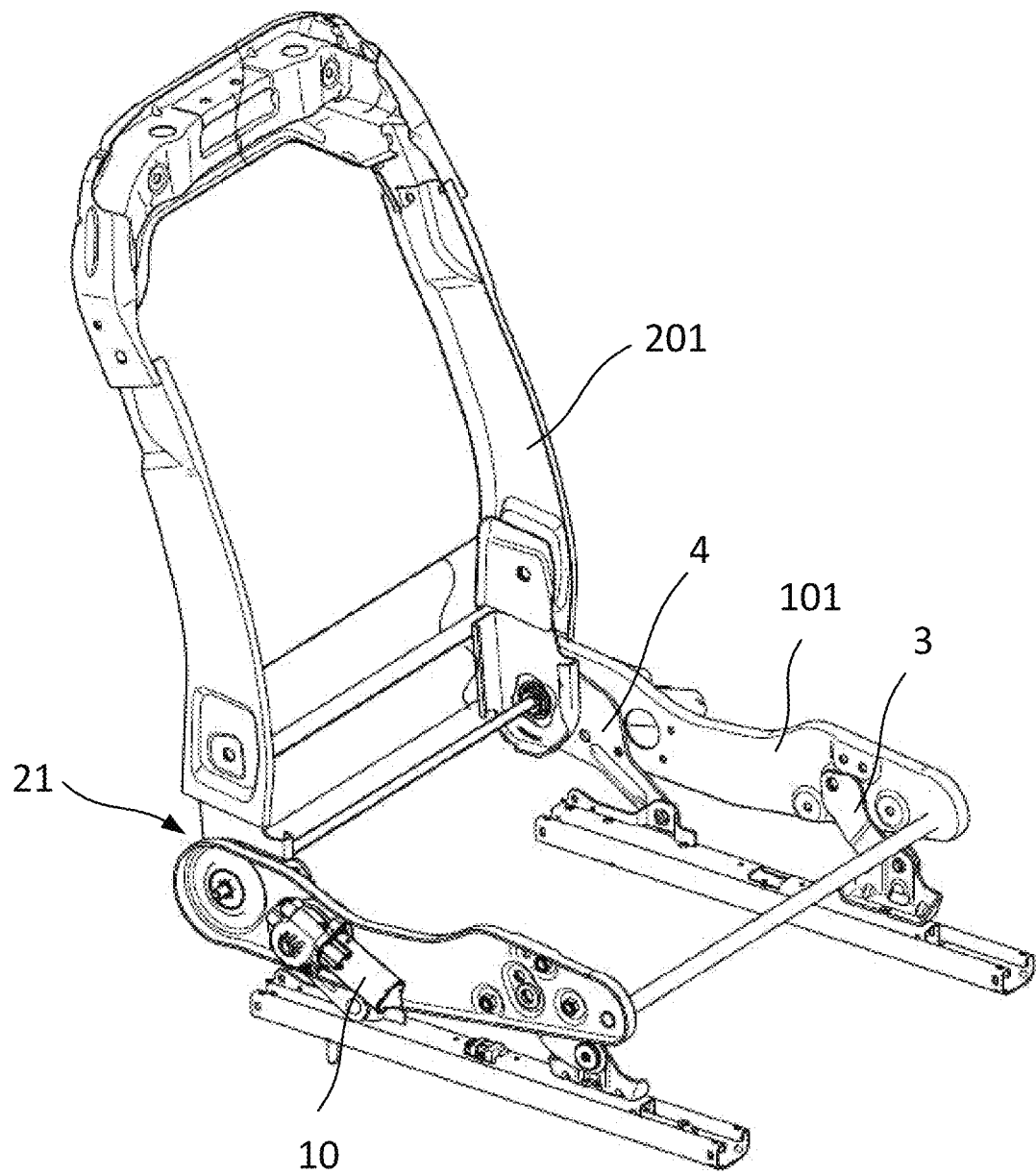
FIG. 4 is a schematic structural diagram of another view of the seat in embodiment 1 of the present invention.

Front bump A at the lower end of the seat back
Touch point B where the passenger's hips touching the seat
Rotation center C when adjusting seat back
Rotation center D when adjusting seat base
Passenger trunk E
Rotation center F when adjusting the seat back of the invention
Seat base 1
Side wall panel 101
First through hole 102
Third through hole 103
Seat back 2
Back wall panel 201
First bracket 3
Second bracket 4
Accommodating hole 401
Tooth part 402
Connecting plate 5
Second through hole 501
Seat base's mounting holder 6
First angle adjuster 7, fixed part of the first angle adjuster 71, twirling part of the first angle adjuster 72
Second angle adjuster 8
Gear 801
First driving mechanism 9
Second driving mechanism 10
First connecting rod 11
Second connecting rod 12
First hinging seat 13
Second hinging seat 14
Bushing 15
Rack plate 16
Limiting part 17, seat back adjusting mechanism 20, rotating part 21.

DETAILED DESCRIPTION OF THE PREFERRED EMBODIMENT

The following examples further illustrate the present disclosure, but the present disclosure is not limited thereto.

Embodiment 1

As shown in FIGS. 3-6, an automobile seat of the present invention comprising a seat base 1, a seat back 2 and a seat back adjusting mechanism 20, the seat back adjusting mechanism 20 comprises a rotating part 21, and the rotating part 21 is disposed at the lower end of the seat back 2; the rotating part 21 is used to rotate around the rear end of the seat base 1 to change the angle between the seat back 2 and the seat base 1, and the rotation center of the rotating part 21 is located below the upper end surface of the seat base 1.

Figure 9:
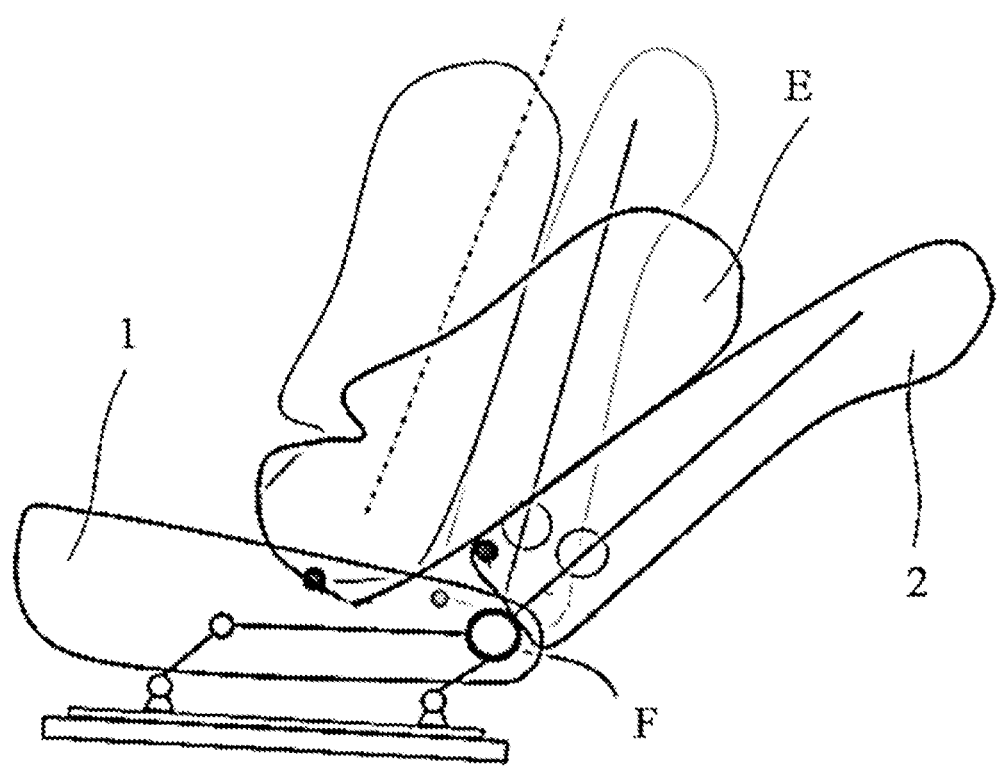
FIG. 9 is a schematic diagram of the use state of the seat back after adjustment in embodiment 1 of the present invention.

As shown in FIG. 9, in the present invention, by setting the rotation center of the seat back 2 at the lower end of the seat back 2 and below the upper end surface of the seat base 1, thus a small step difference may be formed between the lower end part of the seat back 2 and the upper end surface of the seat base 1 when the seat back 2 rotates, and the step difference may even be avoided. As such, it may be ensured that the lower end part of the seat back 2 basically does not abut against and press the back of the passenger, the fit between the back of the passenger and the seat back 2 is improved, and the comfort of riding is ensured.

The automobile seat further includes a seat base adjusting mechanism, and the seat base adjusting mechanism is used to adjust the seat base 1 to realize the up-and-down adjustment of the seat base 1 in the height direction. In this embodiment, by setting the seat base adjusting mechanism, the height of the seat can be adjusted to meet the needs of passengers with different heights, which further improves the ride comfort.

In this embodiment, the seat back adjusting mechanism 20 and the seat base adjusting mechanism are independent of each other during adjustment. This allows adjustments to be made according to the requirements of passengers, and also avoids the occurrence of damage to one of them and inability to adjust the other.

In this embodiment, a first angle adjuster 7 is installed on the rotating part 21, and the fixed part of the first angle adjuster 71 is installed on the seat base 1, the twirling part of the first angle adjuster 72 is installed on the rotating part 21. By installing the angle adjuster on the rotating part 21 of the seat back 2, the seat back 2 can be adjusted conveniently and quantitatively.

The seat base 1 includes two symmetrically arranged side wall panels 101, the rear ends of the two side wall panels 101 are both provided with first through holes 102, and the seat back 2 includes two symmetrically arranged back wall panels 201, the lower end of each back wall panel 201 is fixed with a connecting plate 5, and the connecting plate 5 is provided with a second through hole 501; the fixed part of first angle adjuster 7 and the twirling part of the first angle adjuster 72 are respectively mounted on the first through hole 102 and the second through hole 501. In this embodiment, the rotating part 21 of the seat base 1 is equivalent to being disposed at the second through hole 501 of the connecting plate 5, since the rotating part 21 is fixedly connected with the twirling part of the first angle adjuster 72, the seat back 2 rotates around the seat base 1 by driving the first angle adjuster 7 to rotate.

Both the seat base 1 and the seat back 2 are assembled by framework structure, and the assembly of the seat is realized by the simple side wall panel 101 and the back wall panel 201, which not only reduces the weight of the seat, but also reduces the production cost.

A first connecting rod 11 is provided between the two side wall panels 101, and both ends of the first connecting rod 11 are respectively fixedly connected to the twirling parts of the two first angle adjusters 7. In this embodiment, both side wall panels 101 are provided with a first angle adjuster 7, and both ends of the first connecting rod 11 are respectively fixed to the twirling parts of the two first angle adjusters 7.

In this way, the two side wall panels 101 are connected using the first connecting rod 11, and when the angle adjuster on one of the side wall panels 101 is driven to work, the angle adjuster on the other side can be driven to work, and it is not necessary to drive the angle adjuster on both sides at the same time. At the same time, a second connecting rod 12 can be provided at the front end of the side wall panel 101, and the second connecting rod 12 can keep the two side wall panels 101 stable when moving.

Figure 5:
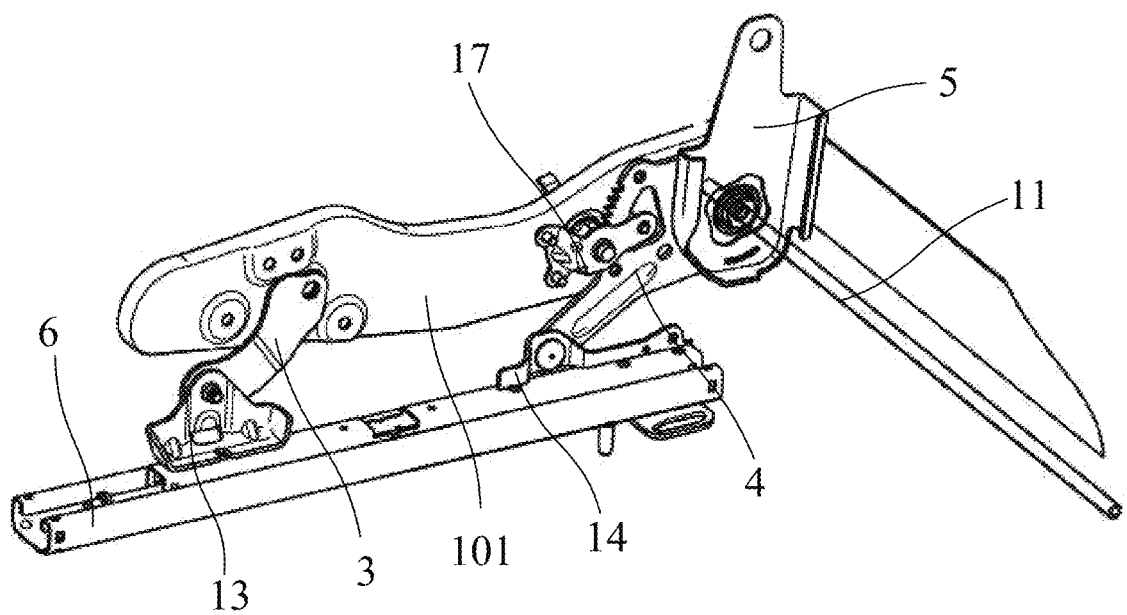
FIG. 5 is a partial schematic structural diagram of the seat in embodiment 1 of the present invention.
Figure 6:
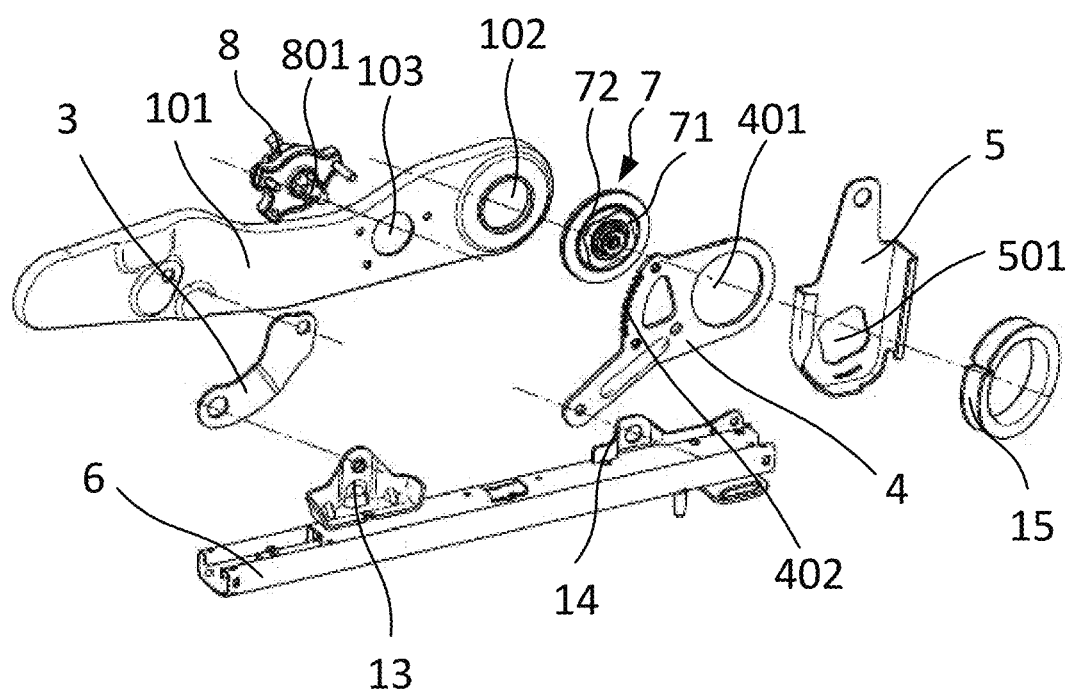
FIG. 6 is an exploded schematic diagram of the partial structure of the seat in embodiment 1 of the present invention.

In this embodiment, as shown in FIGS. 5-6, the seat base adjusting mechanism includes two first brackets 3, two second brackets 4, and second angle adjuster 8, and the two first brackets 3 are correspondingly arranged on both sides of the front end of the seat base 1, two second brackets 4 are correspondingly arranged on both sides of the rear end of the seat base 1; wherein, the first bracket 3 is hinged on the front end of the seat base 1, the upper end of the second bracket 4 rotates freely around the rotation center of the seat back 2, and the lower ends of the first bracket 3 and the second bracket 4 are hinged on the seat base's mounting holder 6 respectively; the second angle adjuster 8 is used to adjust the angle between the first bracket 3 and the seat base 1 or the angle between the second bracket 4 and the seat base 1, so as to realize the up-and-down adjustment of the seat base 1 in the height direction.

The upper end of the second bracket 4 is provided with an accommodating hole 401, and the fixed part of the first angle adjuster 71 passes through the accommodating hole 401 and rotates freely relative to the accommodating hole 401. The second bracket 4 is provided with a tooth part 402, the fixed part of the second angle adjuster 8 is mounted on the seat base 1, and the twirling part of the second angle adjuster 8 is provided with a gear 801 that meshes with the teeth of the tooth part 402, the gear 801 drives the second bracket 4 to rotate using the second driving mechanism 10 to realize the up-and-down adjustment of the seat base 1 in the height direction. Wherein, in order to facilitate the smooth rotation of the second bracket 4, the accommodating hole 401 is a circular through hole, and a bushing 15 is further arranged in the circular through hole, and the fixed part of the first angle adjuster 71 [7] is passed through and fixed in the bushing 15, the bushing 15 rotates freely relative to the accommodating hole 401.

The seat base adjusting mechanism adopts two first brackets 3, two second brackets 4, the seat base 1, and the seat base's mounting holder 6 to form two sets of four-bar linkages, and the two sets of four-bar linkages are adjusted by the second angle adjuster 8, which changes the angle between the first bracket 3 and the seat base 1 or the angle between the second bracket 4 and the seat base 1, so as to realize the up-and-down adjustment of the seat base 1 in the height direction. In order to use the second angle adjuster 8 to change the angle between the second bracket 4 and the seat base 1, a tooth part 402 can be provided on the second bracket 4, and the rotation of the second bracket 4 can be realized by the rotation of the gear 801 on the second angle adjuster 8; at the same time, in order to make the seat base 1 rotate together, the second bracket 4 is provided with an accommodating hole 401 that rotates freely relative to the fixed part of the first angle adjuster 71, so that the second bracket 4 drives the seat base 1 to rotate together during the rotation process, so that the angle between the second bracket 4 and the seat base 1 can be changed to adjust the height of the seat base 1.

In this embodiment, the seat base's mounting holder 6 is provided with a first hinging seat 13 and a second hinging seat 14, and the lower ends of the first bracket 3 and the second bracket 4 are hinged on the first hinging seat 13 and the second hinging seat respectively.

By arranging a hinging seat on the seat base's mounting holder 6, the hinge connection of the lower ends of the first bracket 3 and the second bracket 4 is facilitated.

In this embodiment, the first angle adjuster 7 and the second angle adjuster 8 are respectively provided with a first driving mechanism 9 and a second driving mechanism 10 for driving the twirling part of the first angle adjuster 72 to rotate. Both the first driving mechanism 9 and the second driving mechanism 10 can be a manual adjustment mechanism or an automatic adjustment mechanism, or a manual adjustment mechanism and an automatic adjustment mechanism can be installed on both sides of the seat base 1 respectively, which can be selected according to requirements.

The invention also discloses an automobile, which comprises an automobile seat as described above.

Embodiment 2

Figure 7:
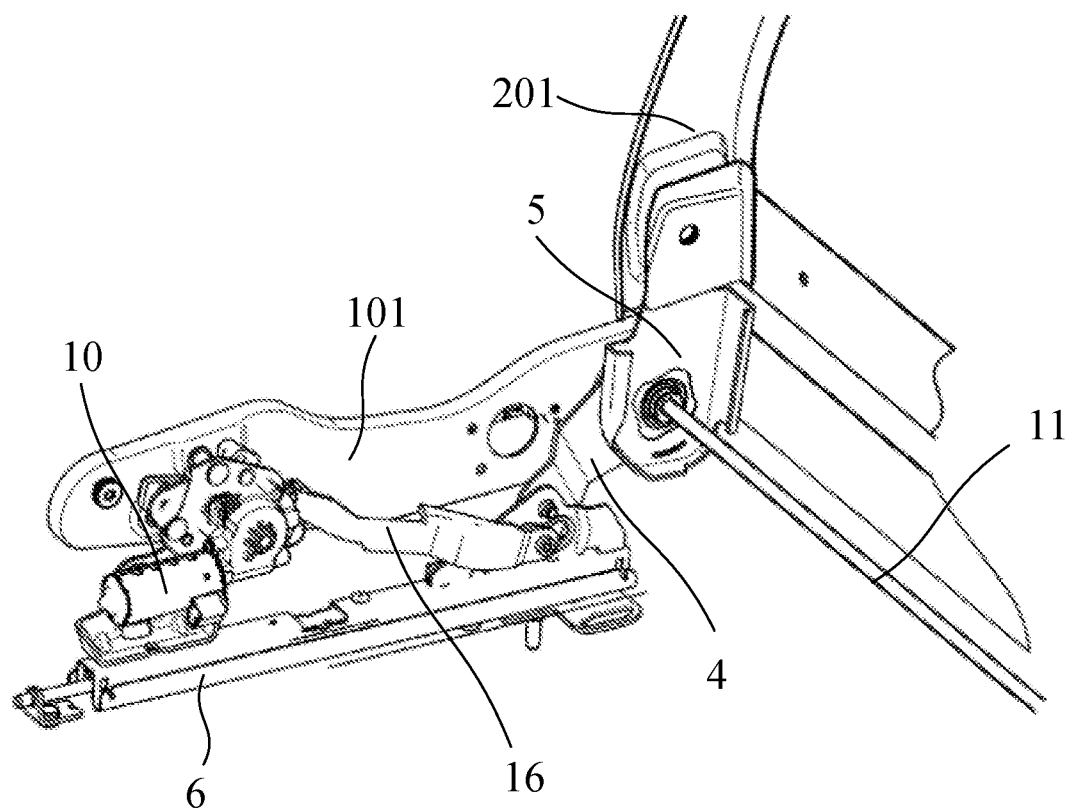
FIG. 7 is a partial schematic structural diagram of the seat in embodiment 2 of the present invention.
Figure 8:
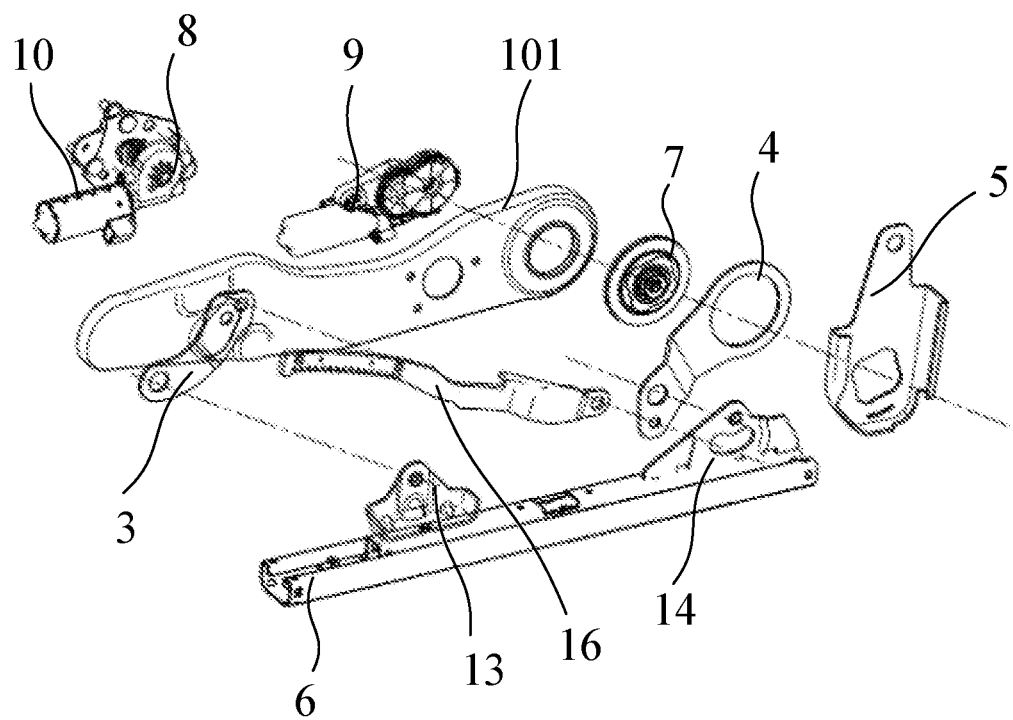
FIG. 8 is an exploded schematic diagram of the partial structure of the seat in embodiment 2 of the present invention.

Compared with the first embodiment, the main difference between the present embodiment and embodiment 1 is the difference in the structure of seat base adjusting mechanism. As shown in FIGS. 7-8, the seat base adjusting mechanism includes two first brackets 3, two second brackets 4 and second angle adjuster 8, and the two first brackets 3 are correspondingly arranged on both sides of the front end of the seat base 1, two second brackets 4 are correspondingly arranged on both sides of the rear end of the seat base 1; the first bracket 3 is hinged on the front end of the seat base 1, the upper end of the second bracket 4 rotates freely around the rotation center of the seat back 2, and the lower ends of the first bracket 3 and the second bracket 4 are hinged on the seat base's mounting holder 6 respectively; the second angle adjuster 8 is used to adjust the angle between the first bracket 3 and the seat base 1 or the angle between the second bracket 4 and the seat base 1, so as to realize the up-and-down adjustment of the seat base 1 in the height direction. The upper end of the second bracket 4 is provided with an accommodating hole 401, and the fixed part of the first angle adjuster 71 [7] passes through the accommodating hole 401 and rotates freely relative to the accommodating hole 401; the seat base adjusting mechanism further includes a rack plate 16, and both ends of the rack plate 16 are hinged on the upper hinge point of the first bracket 3 and the lower end hinge point of the second bracket 4 respectively; the twirling part of the second angle adjuster 8 is provided with a gear 801 that meshes with the teeth of the rack plate 16, the gear 801 drives the rack plate 16 to rotate using the driving mechanism to realize the up-and-down adjustment of the seat base 1 in the height direction. Wherein, in order to facilitate the smooth rotation of the second bracket 4, the accommodating hole 401 is a circular through hole, and a bushing 15 is further arranged in the circular through hole, and the fixed part of the first angle adjuster 71 [7] is passed through and fixed in the bushing 15, the bushing 15 rotates freely relative to the accommodating hole 401. When the second angle adjuster 8 is installed, it is installed on the outer side of the side wall panel 101, and the gear 801 passes through the third through hole 103 on the side wall panel 101 to engage with the teeth of the tooth part 402, and the other side of the side wall panel 101 is provided with a limiting part 17 to limit the rotating shaft of the gear 801.

In this embodiment, the seat height is adjusted mainly by changing the angle between the first bracket 3 and the seat base 1 using the second angle adjuster 8, by adding a rack plate 16, the rotation of the upper end of the rack plate 16 is realized by the rotation of the gear 801 on the second angle adjuster 8, and the rotation of the first bracket 3 is driven at the same time, the second support 4 is provided with an accommodating hole 401 which rotates freely relative to the fixed part of the first angle adjuster 71, so that the first bracket 3 drives the seat base 1 to rotate together during the rotation, so as to change the angle between the first angle adjuster 3 and the seat base 1 to adjust the height of the seat.

Although the specific embodiments of the present invention are described above, those skilled in the art should understand that this is only an example, and the protection scope of the present invention is defined by the appended claims. Those skilled in the art can make various changes or modifications to these embodiments without departing from the principle and essence of the present invention, but these changes and modifications all fall within the protection scope of the present invention.

What is claimed is:

1. An automobile seat, comprising a seat base and a seat back, wherein the automobile seat further includes a seat back adjusting mechanism, and the seat back adjusting mechanism includes a rotating part, and the rotating part is arranged on lower end of the seat back;
    the rotating part is used for rotating about a rear end part of the seat base to enable an angle between the seat back and the seat base to be changed, and a rotation center of the rotating part is located below an upper end surface of the seat base;
    the automobile seat further includes a seat base adjusting mechanism, and the seat base adjusting mechanism is used to adjust the seat base to realize up-and-down adjustment of the seat base in a height direction;
    the seat base adjusting mechanism includes two first brackets and two second brackets, the two first brackets are correspondingly arranged on both sides of a front end of the seat base, the two second brackets are correspondingly arranged on both sides of a rear end of the seat base,
    wherein each first bracket is hinged on the front end of the seat base, an upper end of each second brackets rotates freely around the rotation center of the seat back, and lower ends of each first brackets and each second brackets are hinged on a mounting holder of the seat base respectively;
    a rotation center of the upper end of each second brackets is on the same axis as the rotation center of the rotating part;
    a first angle adjuster is installed on the rotating part, a fixed part of the first angle adjuster is installed on the seat base, and a twirling part of the first angle adjuster is installed on the rotating part; and the upper end of the second bracket rotates freely relative to the fixed part of the first angle adjuster;
    the seat base includes two symmetrically arranged side wall panels, the seat back includes two symmetrically arranged back wall panels, a lower end of each back wall panel is fixed with a connecting plate, and each connecting plate is provided with a second through hole; the twirling part of the first angle adjuster is mounted on the second through hole, the first angle adjuster is installed on a side of the side wall panel facing an interior of the seat base.

2. The automobile seat according to claim 1, wherein the seat back adjusting mechanism and the seat base adjusting mechanism are independent of each other during adjustment.

3. The automobile seat according to claim 2, wherein the first angle adjuster comprises two first angle adjusters, wherein a connecting rod is provided between the two side wall panels, and each end of the connecting rod is respectively fixedly connected to a twirling part of the respective first angle adjusters.

4. The automobile seat according to claim 1, wherein rear ends of the two side wall panels are both provided with first through holes;
    the fixed part of the first angle is mounted on the first through hole.

5. The automobile seat according to claim 4, wherein the seat base's mounting holder is provided with a first hinging seat and a second hinging seat, and the lower ends of the first bracket and the second bracket are hinged on the first hinging seat and the second hinging seat respectively.

6. The automobile seat according to claim 1, wherein the seat base adjusting mechanism includes a second angle adjuster,
    the second angle adjuster is used to adjust an angle between the first bracket and the seat base or an angle between the second bracket and the seat base, so as to realize the up-and-down adjustment of the seat base in the height direction.

7. The automobile seat according to claim 6, wherein the upper end of the second bracket is provided with an accommodating hole, and the fixed part of the first angle adjuster passes through the accommodating hole and rotates freely relative to the accommodating hole;
    the second bracket is provided with a tooth part, a fixed part of the second angle adjuster is mounted on the seat base, and a twirling part of the second angle adjuster is provided with a gear that meshes with teeth of the tooth part, the gear drives the second bracket to rotate using a driving mechanism to realize the up-and-down adjustment of the seat base in the height direction.

8. The automobile seat according to claim 6, wherein the upper end of the second bracket is provided with an accommodating hole, and the fixed part of the first angle adjuster passes through the accommodating hole and rotates freely relative to the accommodating hole;
    the seat base adjusting mechanism further includes a rack plate, and both ends of the rack plate are hinged on upper hinge point of the first bracket and lower end hinge point of the second bracket respectively;
    the twirling part of the second angle adjuster is provided with a gear that meshes with teeth of the rack plate, the gear drives the rack plate to rotate using a driving mechanism to realize the up-and-down adjustment of the seat base in the height direction.

9. The automobile seat according to claim 6, wherein the twirling part of the second angle adjuster is provided with a second driving mechanism, the second driving mechanism is a manual adjustment mechanism or an automatic adjustment mechanism, and the second driving mechanism is used to drive the twirling part of the second angle adjuster.

10. The automobile seat according to claim 1, wherein the twirling part of the first angle adjuster is provided with a first driving mechanism, the first driving mechanism is a manual adjustment mechanism or an automatic adjustment mechanism, and the first driving mechanism is used to drive the twirling part of the first angle adjuster.

11. An automobile, wherein the automobile comprises an automobile seat according to claim 1.

* * * * *